US011102683B2

(12) United States Patent
Sillanpaa et al.

(10) Patent No.: US 11,102,683 B2
(45) Date of Patent: Aug. 24, 2021

(54) SELECTIVE HANDOVER OR REDIRECTION BASED ON INTERFACE AVAILABILITY

(71) Applicant: NOKIA SOLUTIONS AND NETWORKS OY, Espoo (FI)

(72) Inventors: Anna Sillanpaa, Espoo (FI); Philippe Godin, Nozay (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/448,524

(22) Filed: Jun. 21, 2019

(65) Prior Publication Data
US 2019/0394683 A1   Dec. 26, 2019

(30) Foreign Application Priority Data

Jun. 22, 2018   (WO) ................. PCT/EP2018/066838

(51) Int. Cl.
| | |
|---|---|
| *H04W 4/00* | (2018.01) |
| *H04W 36/00* | (2009.01) |
| *H04W 36/32* | (2009.01) |
| *H04W 60/04* | (2009.01) |
| *H04W 84/04* | (2009.01) |

(52) U.S. Cl.
CPC ... *H04W 36/0022* (2013.01); *H04W 36/0033* (2013.01); *H04W 36/0072* (2013.01);
(Continued)

(58) Field of Classification Search
CPC ......... H04W 36/0022; H04W 36/0033; H04W 36/0072; H04W 36/32; H04W 36/0079; H04W 36/14; H04W 8/02
See application file for complete search history.

(56) References Cited

U.S. PATENT DOCUMENTS

| | | |
|---|---|---|
| 2017/0339603 A1 | 11/2017 | Qiu |
| 2017/0339609 A1 | 11/2017 | Youn et al. |

(Continued)

FOREIGN PATENT DOCUMENTS

| | | |
|---|---|---|
| WO | WO 2018/038497 A1 | 3/2018 |
| WO | WO 2018/085187 A1 | 5/2018 |

OTHER PUBLICATIONS

*Session Correlation When N26 is Not Deployed*, NTT DOCOMO, SA WG2 Meeting #124 (Oct. 2017) 14 pages.

(Continued)

*Primary Examiner* — Bo Hui A Zhu
(74) *Attorney, Agent, or Firm* — Alston & Bird LLP

(57) ABSTRACT

A first radio access network (RAN) accesses information indicating an availability status of an interface between an access and mobility management function (AMF) in a first wireless communication system and a mobility management entity (MME) in a second wireless communication system. The first RAN receives a trigger for a handover of a user equipment between the first RAN and a second RAN. The handover is selectively performed via the interface or a redirect via a network element shared by the first and second wireless communication systems based on the availability status. In some cases, the first RAN receive the information indicating the availability status prior to providing the request for the handover and stores the information in a database associated with the first RAN, which access the information from the database.

20 Claims, 9 Drawing Sheets

(52) U.S. Cl.
CPC ........... *H04W 36/32* (2013.01); *H04W 60/04* (2013.01); *H04W 84/042* (2013.01)

(56) References Cited

U.S. PATENT DOCUMENTS

| | | | |
|---|---|---|---|
| 2018/0132141 | A1 | 5/2018 | Huang-Fu et al. |
| 2018/0376384 | A1* | 12/2018 | Youn ................... H04W 8/02 |
| 2019/0069210 | A1* | 2/2019 | Lee .................... H04W 36/32 |
| 2019/0159157 | A1* | 5/2019 | Gupta ................ H04W 60/005 |
| 2019/0191349 | A1 | 6/2019 | Kim et al. |

OTHER PUBLICATIONS

*23.502; 5G to 4G Mobility for SR UE Without N26 Interference*, Cisco, Charter Communications, Comcast, CableLabs, NTT DOCOMO, Nokia, Nokia Shanghai Bell, SA WG2 Meeting #124 (Nov. 2017) 4 pages.

$3^{rd}$ *Generation Partnership Project: Technical Specification Group Core Network and Terminals: Non Access Stratum (NAS) Protocol for 5G System (5GS); Stage 3 (Release 15)*, 3GPP TS 24.501 v2.0.0 (Aug. 2018), 347 pages.

International Search Report and Written Opinion for Application No. PCT/EP2018/066838 dated Dec. 12, 2018, 18 pages.

*Inter-RAT Mobility from NR to EUTRA*, R2-1805576, SGPP TSG-RAN WG2#101bis, HTC (Apr. 2018), 6 pages.

*23.501: Single Registration 5GC-EPC Interworking With Nx Holes*, S2-173341, 3GPP TSG SA WG2 Meeting #121, Intel (May 2017), 4 pages.

*Handling of Single Registration Without Nx Support*, 82-174492, SA WG2 Meeting #122, China Mobile et al. (Jun. 2017), 3 pages.

*Single-Registration With No Nx*, S2-174568, SA WG2 Meeting #122, NTT Docomo et al. (Jun. 2017), 16 pages.

* cited by examiner

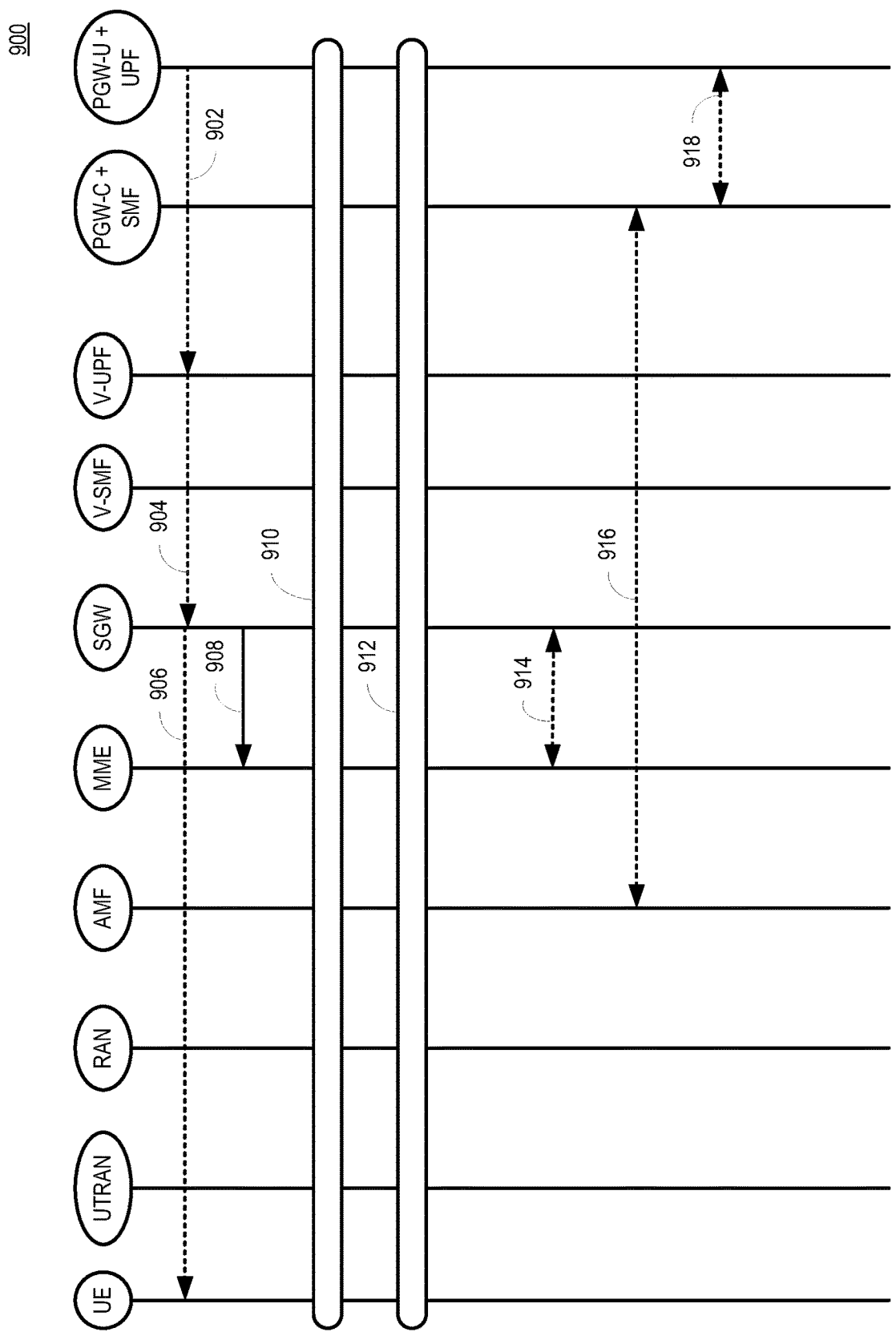

SELECTIVE HANDOVER OR REDIRECTION BASED ON INTERFACE AVAILABILITY

CROSS-REFERENCE TO RELATED APPLICATIONS

This application claims priority to International Application No. PCT/EP2018/066838, filed Jun. 22, 2018, the entire contents of which are incorporated herein by reference.

BACKGROUND

The Third Generation Partnership Project (3GPP) defines standards for wireless communication between user equipment and radio access networks. For example, the 3GPP defines the standards that are used to implement an Evolved Packet System (EPS) that includes an Evolved Packet Core (EPC) network to provide wireless connectivity to user equipment in the system. The EPS standards are also referred to as Fourth Generation (4G) standards or Long Term Evolution (LTE) standards. The 3GPP is in the process of defining the next generation standards, which are referred to as Fifth Generation (5G) standards. Wireless communication systems that operate according to 5G standards provide high throughput, low latency, high mobility, and high connection density using the existing LTE frequency range and additional bands, e.g. millimeter wave bands to support data rates of up to 20 gigabytes per second. The 5G communication systems are initially expected to be deployed in conjunction with existing 4G or LTE communication systems, e.g., as "islands." The 5G communication system could also be configured to provide a non-guaranteed bit rate service (such as enhanced mobile broadband, eMBB) and the LTE communication system offers additional services such as Voice over LTE (VoLTE) and interworking with wideband code division multiple access (WCDMA) to support high data rate services. In some cases, 5G communication systems are also deployed in conjunction with systems that operate according to earlier standards such as Third Generation (3G) standards.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 9 is a third message flow for a handover that is selectively performed using an N26 interface according to some embodiments.

DETAILED DESCRIPTION

Figure 1:
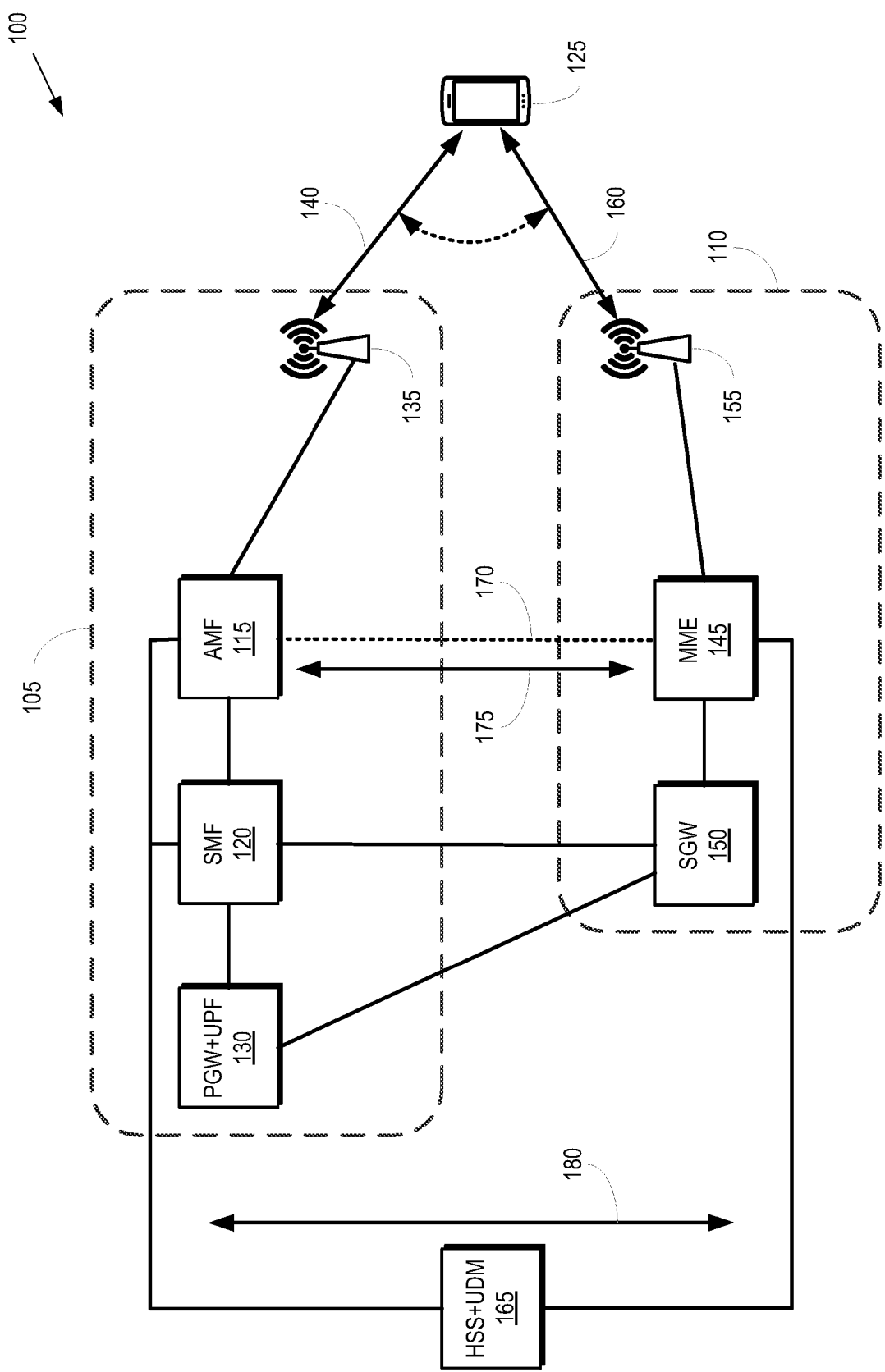
FIG. 1 is a block diagram of a communication system that includes a first wireless communication system that operates according to a first radio access technology (RAT) and a second wireless communication system that operates according to a second RAT according to some embodiments.

Interworking between a 5G communication system and other communication systems is provided by standardized interfaces and/or common entities that are shared by the two systems. For example, the 5G and EPS standards (such as LTE connected to EPC) define an N26 interface between a mobility management function (AMF) in the 5G system and a mobility management entity (MME) in a 4G or LTE system connected to EPC. In addition, a 4G system and a 5G system may share a user plane entity that implements user plane functionality for a packet data unit (PDU) gateway (PGW-U) that operates according to 4G standards and a user plane function (UPF) that operates according to 5G standards in order to offer session and service continuity for mobility between LTE and 5G. In operation, user equipment handoff between different cells, frequency, radio access technologies, and the like. A user connectivity session is maintained in response to a user equipment handing off between the 5G system and another communication system (such as LTE connected to EPC) by transferring a context for the user equipment over the N26 interface. However, the N26 interface is not always available between 5G and LTE systems or parts of these systems. For example, the N26 interface can be permanently unavailable (e.g., between a 5G AMF node and the MMEs of an EPC pool area) or temporarily unavailable (e.g., due to an equipment fault in either communication system). For another example, the N26 interface may not be available to the user equipment because of limitations imposed by the type of user equipment (e.g., dual versus single registered), a user's subscription, a roaming status of the user equipment, a public land mobile network (PLMN) identifier, and the like.

Whenever handover via the N26 interface is not possible or not allowed, a redirect to the target system can be performed for the user equipment. For example, a radio resource control (RRC) connection release including target side information can be performed towards the target cell, frequency, or radio access technology. Instead of transferring the context for the call session over the N26 interface, the MME associated with the target RAN retrieves the context for the call session from the core network (e.g., from a PGW+UPF) and provides the context to the target RAN. The common user plane element can also be used to allow for session and service continuity for the mobile user.

FIGS. 1-9 disclose embodiments of techniques that improve the quality of handovers and call statistics for call sessions involving user equipment that move between radio access networks (RANs) in 4G and 5G wireless communication systems by selectively performing a handover or a redirection based on knowledge (e.g., a determination) of availability of an interface between an access and mobility management function (AMF) in the 5G system and a mobility management entity (MME) in the 4G system. A first RAN hands over the user equipment to a second RAN (in a different wireless communication system) by transferring context information over the interface between the AMF and the MME in response to determining that the interface is available, e.g. based on the stored information. If the stored information indicates that the interface is not available, the call session for the user equipment is redirected from the first RAN to the second RAN via a shared user plane entity that implements user plane functionality for a packet data unit (PDU) gateway (PGW-U) that operates according to 4G standards and a user plane function (UPF) that operates according to 5G standards.

Some embodiments of the first RAN store information indicating whether the interface between the AMF and the MME is available for handing off the user equipment to the second RAN. The information can be preconfigured in one or both RANs, retrieved from an operation and management (O&M) system, accessed from a configuration database, etc. In addition, the interface availability can be exchanged between network entities, e.g. the first RAN and the core network can exchange the intersystem interface availability during setup of an N2 (NGAP) interface between 5G RAN and 5G core network. Interface availability information can also be exchanged during interface related configuration update procedures such as gNB/AMF configuration update over the N2 interface. By the same token, the interface availability can be exchanged over S1-MME interface between LTE RAN and EPC with similar procedures as explained for 5G RAN and 5G core network. The information exchanged can contain information identifying neighboring 4G cells, tracking areas, public land mobile networks (PLMNs), and the like. For example, the exchanged information can identify an area such as a cell indicated by a cell identifier, a tracking area indicated by a tracking area identifier, a public land mobile network (PLMN) identifier, an indicator of an MME/AMF pool area that includes the RAN served by one or more MME or AMF, a RAN-core network interface identifier, and the like. The information identifying the neighbor nodes or areas can be sent by 5G RAN to 5G core network, which replies with information indicating the availability of N26 interface for the corresponding neighbor nodes or areas. If the first RAN does not have information on the needed intersystem interface, e.g. the N26 interface, the first RAN initiates handover to the target system via core network and the core network responds with information indicating the availability status for the targeted cell(s), tracking area(s), or PLMN(s) towards the first RAN. Alternatively, the core network indicates that the N26 interface is not available and the first RAN determines that the intended target cell, area(s), or PLMN is not available. The information can then be stored or modified temporarily, permanently or semi-permanently in response to the first RAN receiving a rejection of a requested handover that indicates that the cause of the rejection is unavailability of the interface between the AMF and the MME. For example, if the first RAN is in the 5G wireless communication system, the first RAN stores information indicating that the interface is unavailable in response to the first RAN attempting to handover a user equipment to the second RAN in the 4G wireless communication system. In some embodiments, similar information indicating the status of the interface is also stored in the second RAN in the 4G wireless communication system.

FIG. 1 is a block diagram of a communication system 100 that includes a first wireless communication system 105 that operates according to a first radio access technology (RAT) and a second wireless communication system 110 that operates according to a second RAT according to some embodiments. In the illustrated embodiment, the first RAT is defined by Fifth Generation (5G) standards and the second RAT is defined by Fourth Generation (4G) or Long Term Evolution (LTE) standards, although the first and second RATs may be different in other embodiments.

The first wireless communication system 105 includes an access and mobility management function (AMF) 115 that manages access control and mobility for devices that are connecting to the communication system 100 via the first wireless communication system 105. The first wireless communication system 105 also includes a session management function (SMF) 120 to set up and manage sessions in the first wireless communication system 105 according to network policies. An association between user equipment 125 and the first wireless communication system 105 is represented as a packet data unit (PDU) session that can be managed by the SMF 120. The PDU session supports data connectivity between the user equipment 125 and a data network.

The first wireless communication system 105 also includes one or more user plane functions (UPF) 130 deployed in the first wireless communication system 105 to provide services to users of the first wireless communication system 105. In the illustrated embodiment, the UPF 130 is combined with a packet data network gateway (PGW) to form a single entity. The PGW functionality provides connectivity between the user equipment 125 and one or more external packet data networks. For example, the PGW provides the point of exit and entry for traffic for the user equipment 125. The PGW also performs policy enforcement, packet filtering, charging support, lawful intercept, and packet screening. One or more radio access networks (RAN) 135 provide wireless connectivity to the user equipment 125 over corresponding air interfaces 140. In some cases, the RAN 135 is referred to as a next generation (NG) RAN 135.

The second wireless communication system 110 includes a mobility management entity 145 that is responsible for paging idle user equipment, performing bearer activation/deactivation, authenticating user equipment, and the like. The MME 145 is also a terminating node for NAS signaling. The MME 145 is responsible for selecting a serving gateway (SGW) 150 for the user equipment 125 during the initial attach procedure and in response to handovers of the user equipment 125 to the second wireless communication system 110. The SGW 150 is a user plane mobility anchor for handover of the user equipment 125 between base stations. The SGW 150 routes and forwards user data packets and terminates downlink data paths for idle user equipment, as well as triggering paging when downlink data arrives for the idle user equipment. The SGW 150 manages and stores contexts for the user equipment 125, which include parameters that define one or more bearers, network internal routing information, and the like. One or more radio access networks (RAN) 155 provide wireless connectivity to the user equipment 125 over corresponding air interfaces 160. In some cases, the RAN 155 is referred to as an Evolved Universal Mobile Telecommunications System (UMTS) Terrestrial Radio Access Network (E-UTRAN) 155.

Entities in both the first wireless communication system 105 and the second wireless communication system 110 are able to access a shared entity 165 that combines a home subscriber server (HSS) and a unified data manager (UDM). The HSS is a master user database that stores subscription-related information such as subscriber profiles associated with the user equipment 125. The HSS also performs authentication and authorization of users and provides location and IP information for the user. The UDM processes credentials, location management, subscription management, and the like. The UDM stores data including user subscription data, such as subscription identifiers, security credentials, access and mobility related subscription data, and session related subscription data.

Some embodiments of the first wireless communication system 105 or the second wireless communication system 110 include other functionality such as a policy control function and a network function repository, which are not shown in FIG. 1 in the interest of clarity. Some embodiments of the communication system 100 are implemented using network function virtualization and software defined networking, as discussed herein. For example, different network slices can be used to instantiate different instances of the AMF 115, the SMF 120, the PGW+UPF 130, the MME 145, the SGW 150, or the HSS+UDM 165 for different users or devices. Each PDU session is part of one network slice.

The AMF 115 and the MME 145 are able to support an interface 170 that is used to convey information between the first wireless communication system 105 and the second wireless communication system 110. The interface 170 is referred to as an N26 interface in some cases and the interface 170 can be used to convey context information for the user equipment 125 in response to the user equipment 125 (or other entity) initiating handover of the user equipment 125 between the RAM 135 and the RAN 155, as indicated by the double-headed arrow 175. However, the interface 170 is not always available to convey information between the first and second wireless communication systems 105, 110. The interface 170 may become temporarily or permanently unavailable due to equipment failures, e.g., in the AMF 115 or the MME 145. Moreover, the interface 170 may not be available to the user equipment 125 depending on the type of the user equipment, e.g., whether the user equipment is dual registered or single registered. Access to the interface 170 may also be restricted on the basis of a subscription associated with the user equipment 125, a roaming status of the user equipment 125, a public land mobile network (PLMN) associated with the user equipment 125, and the like.

Rejection messages are generated in response to a request for a handover of the user equipment 125 being rejected due to unavailability of the interface 170. Some embodiments of the rejection message include an information element that indicates a cause of the rejection such as "no N26 interface available." The rejection message can also indicate whether the rejection is permanent or temporary, in which case a time interval of unavailability can also be indicated in the rejection message. The rejection of the handover request due to unavailability of the interface 170 applies to a rejection area such as an individual cell served by one of the RAN 135, 155, a tracking area that includes one or more of the RAN 135, 155, a PLMN associated with the user equipment 125, a network slice that is used to instantiate one or more entities within the first or second wireless communication systems 105, 110, and the like. Some embodiments of the rejection message include an information element that indicates the rejection area. The information indicating availability or unavailability of the interface 170 is stored in a form that is accessible to the RAN 135, 155, e.g., in databases (not shown in FIG. 1) associated with the RAN 135 or the RAN 155. The RAN 135, 155 are therefore able to "learn" whether interfaces such as the interface 170 are available to support handovers to various neighboring wireless communication systems. As discussed below, the availability statuses of other interfaces are preconfigured to the databases associated with the RAN 135, 155 in some embodiments.

Handover of the user equipment 125 between the first wireless communication system 105 and the second wireless communication system 110 is performed based on the availability status of the interface 170. For example, if the user equipment 125 measurement report triggers handover from the RAN 135 to the RAN 155, the RAN 135 accesses information indicating an availability status of the interface 170, e.g., from an associated database of availability statuses of interfaces to neighboring cells, tracking areas, PLMNs, network slices, and the like. For example, the RAN 135 can access the database in response to receiving a trigger for handover of the user equipment 125. The RAN 135 then selectively performs the handover via the interface 170 or a redirect via the network entity 165 based on the availability status for the interface 170. If the availability status indicates that the interface 170 is available, the RAN 135 performs the handover via the interface 170. The handover may include data forwarding form source RAN to the target RAN including transmission of data over the corresponding air interfaces.

However, if the availability status indicates that the interface 170 is not available, the RAN 135 transmits a redirect with a radio resource control (RRC) connection release to the target RAN 155. In that case, context information for the call session is transmitted to the second wireless communication system 110 via the shared entity 165, as indicated by the double-headed arrow 180. In response to the target RAN 155 receiving the RRC release, the MME 145 retrieves the context for the call session from the PGW+UPF 130 via the HSS+UDM 165 and provides the context to the target RAN 155, which creates a new context for the user equipment 125 based on the retrieved context information. In some embodiments, the RAN 135 evaluates the availability statuses of interfaces between the AMF 115 and other MME associated with other RAN that are candidates for handing off the user equipment 125. If an interface is available between the AMF 115 and one of the other MME, the user equipment 125 is handed off via the available interface instead of performing the redirect.

Figure 2:
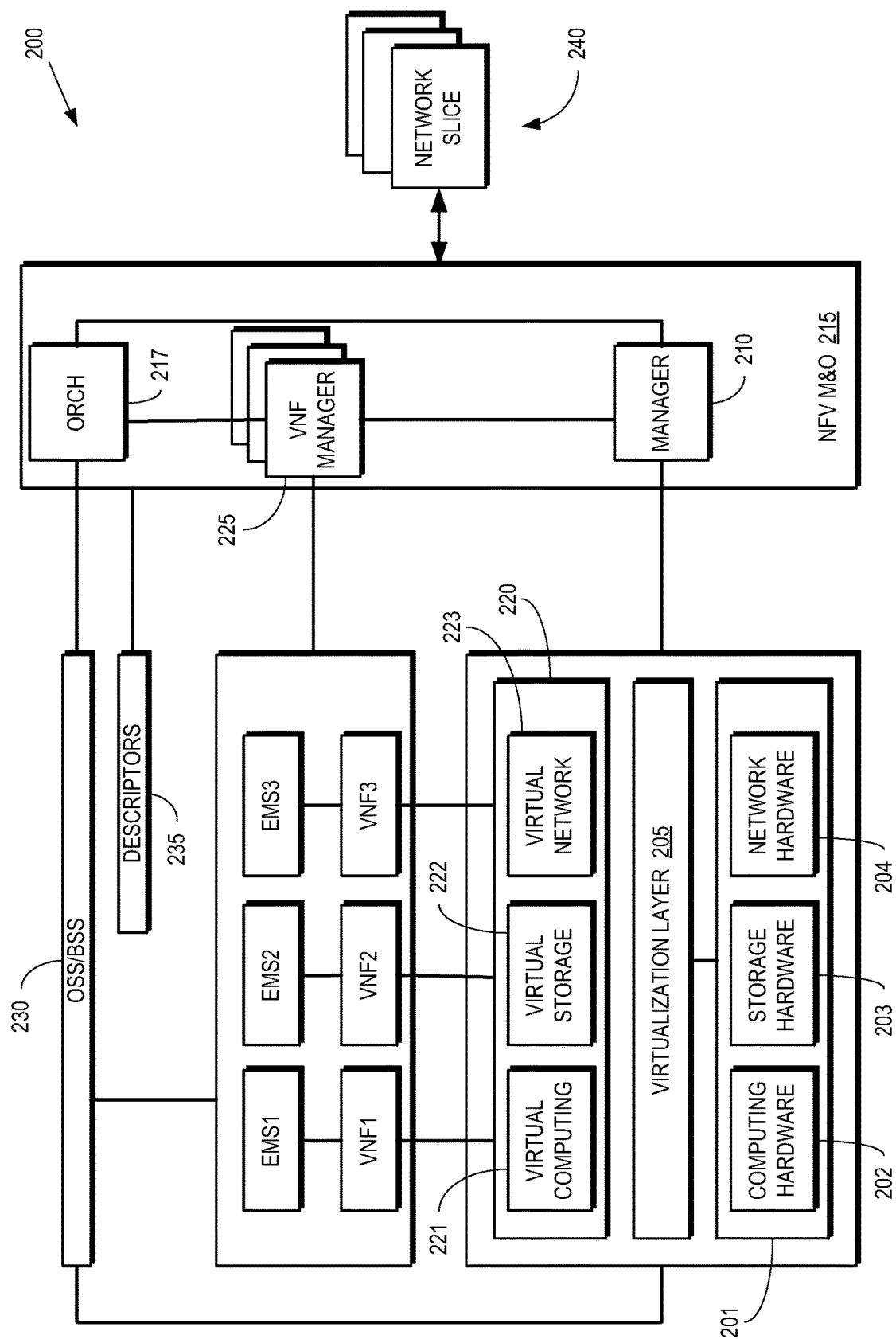
FIG. 2 is a block diagram of a network function virtualization (NFV) architecture according to some embodiments.

FIG. 2 is a block diagram of an NFV architecture 200 according to some embodiments. The NFV architecture 200 is used to implement some embodiments of the communication system 100 shown in FIG. 1. The NFV architecture 200 includes hardware resources 201 including computing hardware 202 such as one or more processors, storage hardware 203 such as a memory, and network hardware 204 such as a transmitter, receiver, or transceiver. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) are implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 includes an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 is used to implement network slices 240 that provide user plane or control plane functions, such as instances of the AMF 115, the SMF 120, the PGW+UPF 130, the MME 145, the SGW 150, or the HSS+UDM 165 shown in FIG. 1. A network slice 240 is a complete logical network that provides communication services and network capabilities, which can vary from slice to slice. User equipment can concurrently access multiple network slices 240. Some embodiments of user equipment provide Network Slice Selection Assistance Information (NSSAI) parameters to the network to assist in selection of a slice instance for the user equipment. A single NS SAI may lead to the selection of several slices 240. The NFV architecture 200 can also use device capabilities, subscription information and local operator policies to do the selection of one or more of the network slices 240. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different subsets of the network slices 240.

Figure 3:
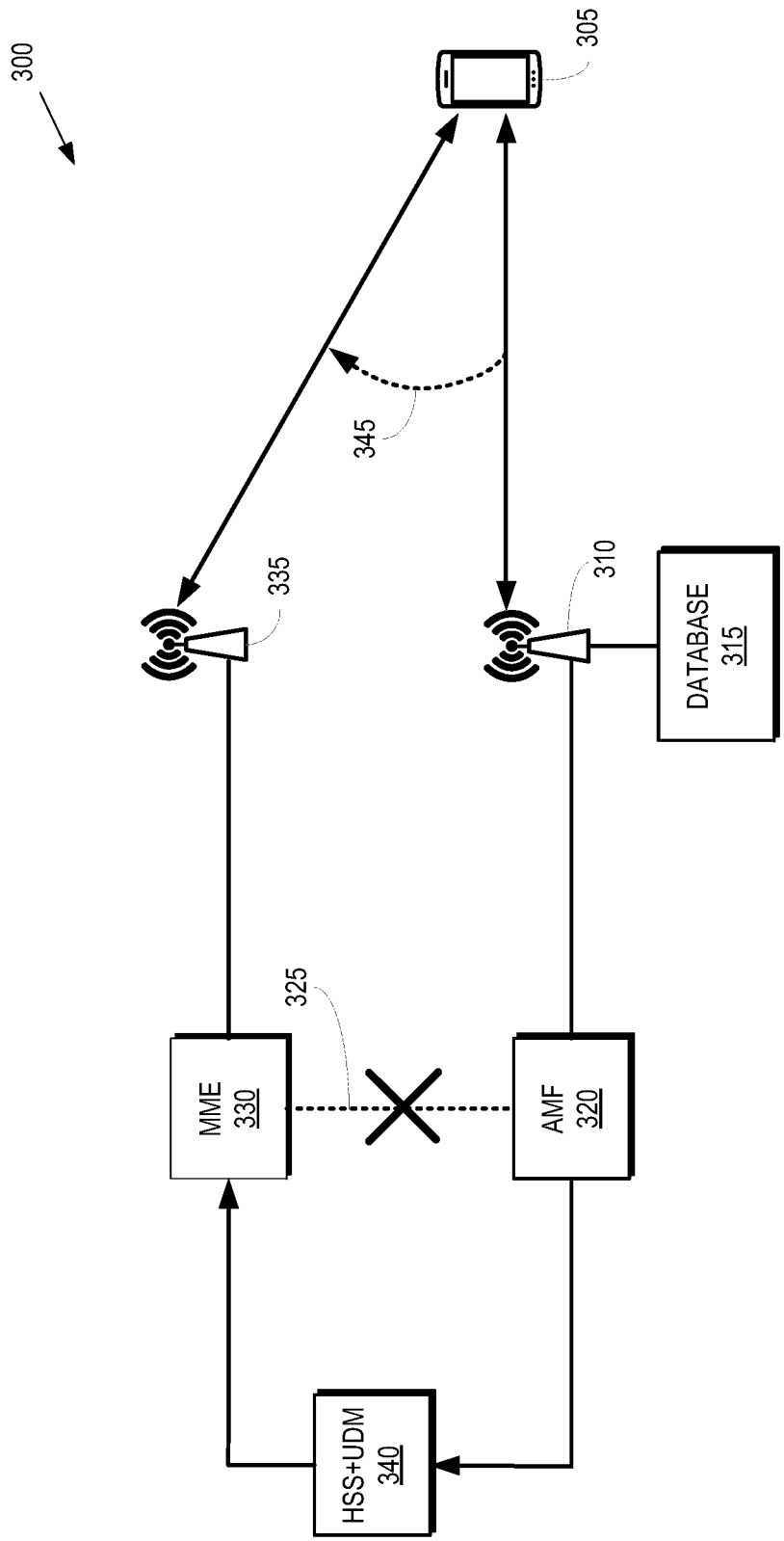
FIG. 3 is a block diagram of a wireless communication system that supports selective handover or redirection of a call session based on availability of an interface according to some embodiments.

FIG. 3 is a block diagram of a wireless communication system 300 that supports selective handover or redirection of a call session based on availability of an interface according to some embodiments. The wireless communication system 300 represents some embodiments of the communication system 100 shown in FIG. 1 although not all of the entities of the communication system 100 are reproduced in FIG. 4 in the interest of clarity. In the illustrated embodiment, user equipment 305 has established a call session with a 5G RAN 310 that includes (or otherwise has access to) a database 315 that stores information indicating availability statuses of interfaces between an AMF 320 and one or more MME. For example, the database 315 stores information indicating an availability status of an interface 325 between the AMF 320 and the MME 330. Although not shown in FIG. 3 in the interest of clarity, the 4G RAN attached to the MME 330 can also include or have access to a database that stores information indicating availability statuses of interfaces between the MME 330 and one or more AMF including the AMF 320.

Some embodiments of the database 315 are dynamically populated with availability status information for the interface 325, as well as other interfaces between the AMF 320 and other MME (not shown in FIG. 3) associated with the wireless communication system 300. For example, if the user equipment 305 initiates a handover from the 5G RAN 310 to a 4G RAN 335 that is connected to the MME 330, an availability status for the interface 325 is determined and stored in the database 315 based on the response to the handover request. In the illustrated embodiment, the interface 325 is not available to support handover of the user equipment 305 from the 5G RAN 310 to the 4G RAN 335. The AMF 320 therefore responds to the handover request by transmitting a rejection message to the 5G RAN 310. The rejection message includes information indicating that the interface 325 is not available, such as an information element that identifies the cause of the handover rejection as "N26 interface unavailable." As discussed herein, the rejection message can also include other availability status information such as a duration of the availability status or reasons that the interface 325 is unavailable. The 5G RAN 310 uses the information in the rejection message to determine that the interface 325 is unavailable and stores an availability status for the interface 325 in the database 315 so that the availability status can be accessed from the database 315 in response to subsequent handover requests from the user equipment 305 or other user equipment served by the 5G RAN 310.

Some embodiments of the database 315 are preconfigured with availability status information for interfaces including the interface 325. For example, availability status information in the database 315 can be preconfigured by retrieving the availability status information from an operation and management (O&M) system, accessing the availability status information from a configuration database, and the like. In some embodiments, the availability status information is exchanged between network entities, e.g. the 5G RAN 310 exchanges interface availability status information with the core network during setup of an N2 (NGAP) interface between the 5G RAN 310 and 5G core network (not shown in FIG. 3). Interface availability status information can also be exchanged during interface related configuration update procedures such as gNB/AMF configuration update over the N2 interface or over an S1-MME interface between the 4ˆ RAN 335 and an EPC network (not shown in FIG. 3). The information exchanged can contain information identifying neighboring 4G cells, tracking areas, public land mobile networks (PLMNs), and the like. For example, the 5G RAN 310 can send information identifying the neighbor nodes or areas to the 5G core network, which replies with information indicating the availability of N26 interface for the corresponding neighbor nodes or areas.

Pre-configuration and dynamic configuration of the database 315 can be used in different combinations to modify or update the availability status information in the database 315. For example, pre-configuration is used to establish availability status information for an initial set of interfaces. The status information is subsequently modified, e.g., based on information in rejection messages received in response to handover requests. Modifying the availability status information includes adding entries for new cells, tracking area identifiers, PLMNs or changing the availability status for entries for interfaces associated with previously identified cells, tracking areas, or PLMNs. For example, if the database 315 is preconfigured with availability status information that indicates that the interface 325 is available to support handovers, but the interface 325 subsequently becomes unavailable, the availability status information in the corresponding entry in the database 315 is modified to indicate that the interface 325 is unavailable. The change in the status of the interface 325 can be detected using information in a rejection message. The availability status of other RAN in an area (such as a cell, tracking area, PLMN, MME/AMF pool, etc.) that includes the target RAN 335 can also be modified based on the change in the status of the interface 325.

The 5G RAN 310 determines that the interface 325 is not available to support the requested handover, e.g., using information accessed from the database 315. In response to determining that the interface 325 is not available, the 5G RAN 310 initiates or triggers a redirect with RRC connection release to the target 4G RAN 335. The redirect indicates one or more of a cell identifier of the 4G RAN 335, a tracking area identifier for a tracking area that includes the 4G RAN 335, a frequency channel used by the 4G RAN 335, a radio access technology (such as LTE) used by the 4G RAN 335, and the like. The redirect is provided to a shared network entity 340 that implements an HSS and a UDM. Context information for the call session involving the user equipment 305 is conveyed from the 5G RAN 310 to the 4G RAN 335 via the shared network entity 340. The user equipment 305 hands off from the 5G RAN 310 to the 4G RAN 335, as indicated by the arrow 345. Call session continuity is preserved by exchanging information via the shared network entity 340, even though the interface 325 is not available.

Figure 4:
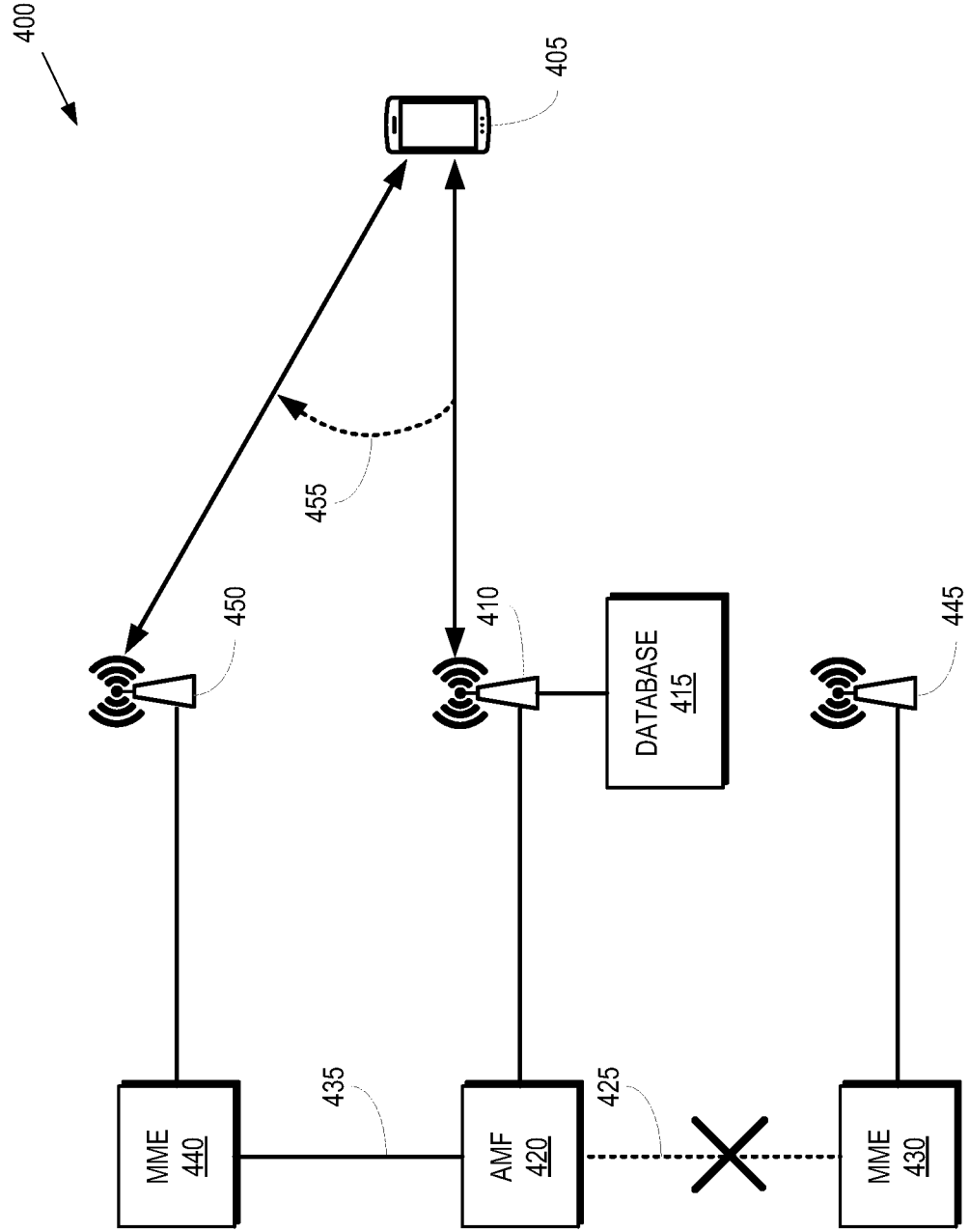
FIG. 4 is a block diagram of a wireless communication system that supports selective handover of a call session to different radio access network (RAN) based on availability of an interface according to some embodiments.

FIG. 4 is a block diagram of a wireless communication system 400 that supports selective handover of a call session to different RAN based on availability of an interface according to some embodiments. The wireless communication system 400 represents some embodiments of the communication system 100 shown in FIG. 1 although not all of the entities of the communication system 100 are reproduced in FIG. 4 in the interest of clarity. In the illustrated embodiment, user equipment 405 has established a call session with a 5G RAN 410 that includes (or otherwise has access to) a database 415 that stores information indicating availability statuses of interfaces between an AMF 420 and a set of MMES that are associated with potential handover candidate RAN for the user equipment 405. For example, the database 415 stores information indicating an availability status of an interface 425 between the AMF 420 and the MME 430 and then availability status of an interface 435 between the AMF 420 and the MME 440. As discussed herein, the availability statuses of the set of interfaces 425, 435 can be dynamically configured or modified, as well as being preconfigured or modified using information requested from or provided by other network entities. Although not shown in FIG. 4 in the interest of clarity, the 4G RANs 445, 450 attached to the MMES 430, 440 can also include or have access to a database that stores information indicating availability statuses of interfaces between the MMES 430, 440 and one or more AMF including the AMF 420.

In the illustrated embodiment, the user equipment 405 requests handover from the 5G RAN 410 to the 4G RAN 445. In response to receiving the request, the 5G RAN 410 accesses an availability status of the interface 425 from the database 415. The 5G RAN 410 determines, based on the availability status, that the interface 425 is not available to support the handover of the user equipment 405 to the 4G RAN 445. The user equipment 405 therefore requests handover to another candidate 4G RAN 450. One or more additional candidate handoff targets are either indicated in the initial request for handover from the user equipment 405 or the user equipment 405 can provide information identifying the additional candidate handoff targets in response to the 5G RAN 410 indicating that the interface 425 is not available. The additional candidate handoff targets are identified based on of parameters such as signal strength measurements, neighbor lists, priority lists, and the like.

The 5G RAN 410 accesses an availability status of the interface 435 from the database 410 and determines, based on the availability status, that the interface 435 is available to support the requested handover. The interface 435 is therefore used to convey context information for the call session from the 5G RAN 410 to the 4G RAN 450. The user equipment 405 hands off its call session from the 5G RAN 410 to the 4G RAN 450, as indicated by the arrow 455. Thus, the handoff of the user equipment 405 does not require performing a redirect via a shared entity (such as a combined HSS+UDM) because the 5G RAN 410 is able to identify another candidate 4G RAN 450 that is connected to the MME 440, which has an available interface 435 to the AMF 420.

Figure 5:
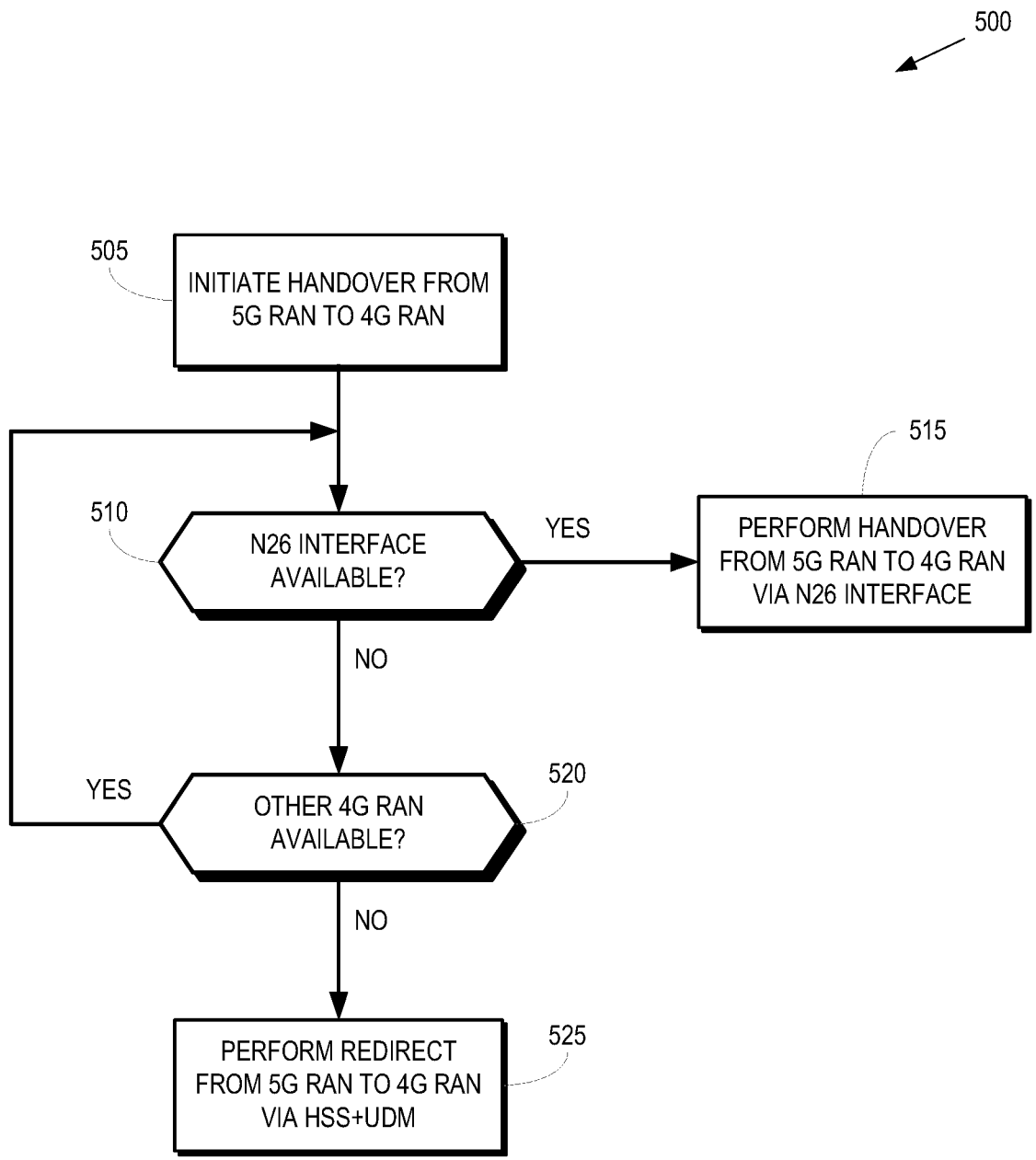
FIG. 5 is a flow diagram of a method of selectively performing a handover via an interface between an AMF and an MME or a redirect via a shared network entity according to some embodiments.

FIG. 5 is a flow diagram of a method 500 of selectively performing a handover via an interface between an AMF and an MME or a redirect via a shared network entity according to some embodiments. The method 500 is implemented in some embodiments of the communication system 100 shown in FIG. 1, the communication system 300 shown in FIG. 3, and the communication system 400 shown in FIG. 4. The method 500 shown in FIG. 5 is implemented in a 5G RAN in response to a request to hand off the user equipment to a 4G RAN. However, some embodiments of the method 500 are implemented in a 4G RAN to determine whether to selectively perform a handover to a 5G RAN via an interface between an MME associated with the 4G RAN and an AMF associated with the 5G RAN.

At block 505, a handover of the user equipment from a 5G RAN to a 4G RAN is initiated. Some embodiments of the user equipment initiate the handover based on signal strength measurements or channel quality measurements. However, the handover can be initiated in response to other events or the handover can be initiated by network entities.

At decision block 510, the 5G RAN determines whether an interface, such as an N26 interface, is available between the AMF associated with the 5G RAN and the MME associated with the 4G RAN. If so, the method 500 flows to block 515 and the user equipment is handed over from the 5G RAN to the 4G RAN using the available interface, as discussed herein. If the 5G RAN determines that the interface is not available, the method 500 flows to decision block 520.

At decision block 520, the 5G RAN determines whether other 4G RAN (e.g. 4G RANs, 4G RAN cells and/or 4G RAN Nodes) are available as targets of the requested handover. In some cases, other candidate 4G RANs are provided by the user equipment in the initial handover request message. Alternatively, the 5G RAN can request identifiers of the other candidate 4G RANs from the user equipment in response to determining (at decision block 510) that the interface for the previously requested handover is not available. If other 4G RANs are available, the method 500 flows back to decision block 510. If the 5G RAN determines that there are not any additional 4G RANs available, the method 500 flows to block 525 and a redirect is performed to maintain session continuity between the 5G RAN and the 4G RAN by transmitting context information via a shared network entity that combines HSS+UDM functionality.

In some embodiments, source cell 5G RAN sends a handover command with target 4G RAN information (e.g. cell/frequency) and UE detaches from old cell and synchronizes to and accesses new cell/frequency (e.g. with Random access procedure) and establishes the bearers (e.g. SRBs and DRB with RRC connection reconfiguration), user plane path and where other needed procedures are further carried out between the UE and the system (in RAN and core network) to support the application service(s) the user is using.

In some embodiments, the user is detached from source RAN (with RRC connection release with target information, cell/frequency) with instruction to connect to given target. In target side UE synchronizes to target RAN (e.g. cell/frequency) and accesses the RAN (typically with Random Access) and the radio and core network establishes the resources for the user. The core network is accessed typically with location updating (e.g. service request procedure) or new registration (e.g. Attach procedure) and the old context is re-established (from PGW+UPF) or created at fresh in core network.

Figure 6:
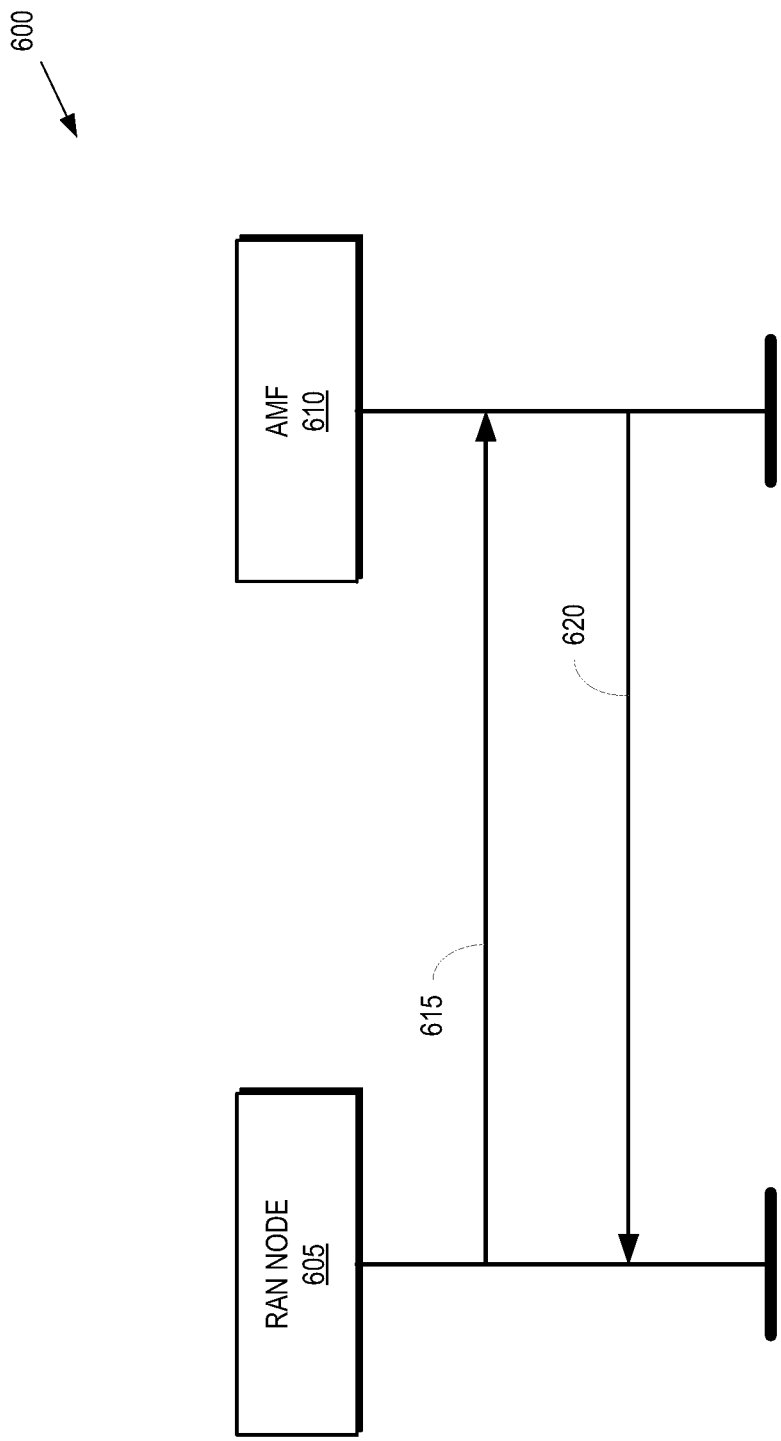
FIG. 6 is a block diagram of a portion of a wireless communication system including a RAN node and an AMF according to some embodiments.

FIG. 6 is a block diagram of a portion 600 of a wireless communication system including a RAN node 605 and an AMF 610 according to some embodiments. The portion 600 of the wireless communication system represents portions of some embodiments of the communication system 100 shown in FIG. 1, the communication system 300 shown in FIG. 3, and the communication system 400 shown in FIG. 4.

The RAN node 605 initiates a setup procedure by transmitting a setup request message 615 including data in one or more information elements to the AMF 610. The AMF 610 responds with a set up response message 620 including data in one or more information elements. If the AMF name information element is included in the set up response message 620, the RAN node 605 stores the name of the AMF 610 and uses this information to identify the AMF 610.

If a Neighbor TA Request List information element is included in the setup request message 615, the AMF 610 provides information identifying the requested tracking area list in the Neighbor TA Response List information element of the set up response message 620. If an N26 interface information element is included within the Neighbor TA Response List information element of the set up response message 620, the RAN node 605 stores this information and takes this information into account when deciding whether handover or redirection is done to send a user equipment to EPS.

Some embodiments of the setup request message 615 include the information elements disclosed below. The setup request message 615 is transmitted by RAN node 605 to transfer application layer information for an NG-C interface instance.

Direction: RAN node 605→AMF 610

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Global RAN Node ID | M | | 9.3.1.5 | | YES | reject |
| RAN Node Name | O | | PrintableString (SIZE(1 ... 150, ... )) | | YES | ignore |
| Supported TA List | | 1 | | Supported TAs in the NG-RAN node. | GLOBAL | reject |
| >Supported TA Item IEs | | 1 ... <maxnoofTACs> | | | | |
| >>TAC | M | | 9.3.3.10 | Broadcast TAC | — | |
| >>Broadcast PLMN List | | 1 | | | — | |
| >>>Broadcast PLMN Item IEs | | 1 ... <maxnoofBPLMNs> | | | | |
| >>>>PLMN Identity | M | | 9.3.3.5 | Broadcast PLMN | — | |
| >>>>TAI Slice Support List | M | | Slice Support List 9.3.1.17 | Supported S-NSSAIs per TA. | — | |
| Neighbour TA Request List | | 0 ... 1 | | Indicates a request per TA neighbouring the cells of the NG-RAN node. | GLOBAL | reject |
| >PLMN Support Item IEs | | 1 ... <maxnoofPLMNs> | | | | |
| >>PLMN Identity | M | | 9.3.3.5 | | — | |
| >>TA Request List | M | | | | — | |
| Default Paging DRX | M | | INTEGER (0 ... 63) | This IE may need to be refined | YES | ignore |

| Range bound | Explanation |
|---|---|
| maxnoofTACs | Maximum no. of TACs. Value is 256. |
| maxnoofBPLMNs | Maximum no. of Broadcast PLMNs. Value is 12. |

Some embodiments of the setup response message 620 include the information elements disclosed below. The setup response message 620 is transmitted by the AMF 610 to transfer application layer information for an NG-C interface instance.

Direction: AMF 610→RAN node 605

| IE/Group Name | Presence | Range | IE type and reference | Semantics description | Criticality | Assigned Criticality |
| --- | --- | --- | --- | --- | --- | --- |
| Message Type | M | | 9.3.1.1 | | YES | reject |
| AMF Name | M | | AMF Name 9.3.3.21 | | YES | reject |
| Served GUAMI List | | 1 | | | GLOBAL | reject |
| >Served GUAMI Item IEs | | 1 . . . <maxnoofServedGUAMIs> | | | | |
| >>GUAMI | M | | 9.3.3.3 | | — | |
| >>Backup AMF Name | O | | AMF Name 9.3.3.21 | | — | |
| Relative AMF Capacity | M | | 9.3.1.32 | | YES | ignore |
| PLMN Support List | | 1 | | | GLOBAL | reject |
| >PLMN Support Item IEs | | 1 . . . <maxnoofPLMNs> | | | — | |
| >>PLMN Identity | M | | 9.3.3.5 | | — | |
| >>Slice Support List | M | | 9.3.1.17 | Supported S-NSSAIs per PLMN | — | |
| Neighbour TA support List | | 1 | | Indicates a response per TA neighbouring the cells of the NG-RAN node. | GLOBAL | reject |
| >PLMN Support Item IEs | | 1 . . . <maxnoofPLMNs> | | | — | |
| >>PLMN Identity | M | | 9.3.3.5 | | — | |
| >>TA Response List | O | | 9.3.1.x | | — | |
| Criticality Diagnostics | O | | 9.3.1.3 | | YES | ignore |

| Range bound | Explanation |
| --- | --- |
| maxnoofServedGUAMIs | Maximum no. of GUAMIs served by an AMF. Value is 256. |
| maxnoofPLMNs | Maximum no. of PLMNs per message. Value is 12. |

An embodiment of a tracking area (TA) request list is shown below. The TA request list information element is used to request information from 5G core network about a TAC which is needed for the RAN node 605.

| >Supported TA Item IEs | | 1 . . . <maxnoofTACs> | | |
| --- | --- | --- | --- | --- |
| >>TAC | M | | 9.3.3.10 | — |
| >> TAC request | M | | ENUMERATED (N26 support, . . . ) | — |

An embodiment of a TA response list is shown below. The TA response list information element indicates whether there is N26 availability for Tracking Areas neighboring the cells of the RAN node 605.

| >Supported TA Item IEs | | 1 . . . <maxnoofTACs> | | |
| --- | --- | --- | --- | --- |
| >>TAC | M | | 9.3.3.10 | — |

-continued

| | | | | |
| --- | --- | --- | --- | --- |
| >> N26 interface | O | | ENUMERATED (supported, not supported, . . . ) | — |

A cause information element is included in messages such as rejection messages transmitted from the AMF 610 to the RAN node 605. In some embodiments, the cause information element includes the "N26 interface not available" because to indicate that failure of the requested handover is due to the N26 interface not being available for a target tracking area identifier.

| IE/Group Name | Presence | Range | IE type and reference | Semantics description |
|---|---|---|---|---|
| CHOICE Cause Group >Radio Network Layer | M | | | |
| >>Radio Network Layer Cause | M | | ENUMERATED (Unspecified, TXnRELOCOverall expiry, Successful handover, Release due to NG-RAN generated reason, Release due to 5GC generated reason, Handover cancelled, Partial handover, Handover failure in target 5GC/NG-RAN node or target system, Handover target not allowed, TNGRELOCoverall expiry, TNGRELOCprep expiry, Cell not available, Unknown target ID, No radio resources available in target cell, Unknown local UE NGAP ID, Inconsistent remote UE NGAP ID, Handover desirable for radio reasons, Time critical handover, Resource optimisation handover, Reduce load in serving cell, User inactivity, Radio connection with UE lost, Load balancing TAU required, Radio resources not available, Invalid QoS combination, Failure in the radio interface procedure, Interaction with other procedure, Unknown PDU Session ID, Unknown QoS Flow ID, Multiple PDU Session ID Instances, Multiple QoS Flow ID Instances, Encryption and/or integrity protection algorithms not supported, NG intra system handover triggered, NG inter system handover triggered, Xn handover triggered, Not supported 5QI value, UE context transfer, IMS voice EPS fallback or RAT fallback triggered, UP integrity protection not possible, UP confidentiality protection not possible, Slice not supported, UE in RRC_INACTIVE state not reachable, . . . ) | |
| >Transport Layer | | | | |
| >>Transport Layer Cause | M | | ENUMERATED (Transport resource unavailable, Unspecified, . . . ) | |
| >NAS | | | | |
| >>NAS Cause | M | | ENUMERATED (Normal release, Authentication failure, Deregister, Unspecified, . . . ) | |
| >Protocol | | | | |
| >>Protocol Cause | M | | ENUMERATED (Transfer syntax error, Abstract syntax error (reject), Abstract syntax error (ignore and notify), Message not compatible with receiver state, Semantic error, Abstract syntax error (falsely constructed message), Unspecified, . . . ) | |
| >Misc | | | | |
| >>Miscellaneous Cause | M | | ENUMERATED (Control processing overload, Not enough user plane processing resources, Hardware failure, O&M intervention, Unknown PLMN, Unspecified, . . . ) | |

The meaning of the different cause values is described in the following table. In general, "not supported" cause values indicate that the related capability is missing. On the other hand, "not available" cause values indicate that the related capability is present, but insufficient resources were available to perform the requested action.

| | Meaning |
|---|---|
| Radio Network Layer cause | |
| Unspecified | Sent for radio network layer cause when none of the specified cause values applies. |
| TXnRELOCOverall expiry | The timer guarding the handover that takes place over Xn has abnormally expired. |
| Successful handover | Successful handover. |
| Release due to NG-RAN generated reason | Release is initiated due to NG-RAN generated reason. |
| Release due to 5GC generated reason | Release is initiated due to 5GC generated reason. |
| Handover cancelled | The reason for the action is cancellation of Handover. |
| Partial handover | Provides a reason for the handover cancellation. The HANDOVER COMMAND message from AMF contained PDU Session Resource to Release List IE or QoS flow to Release List and the source NG-RAN node estimated service continuity for the UE would be better by not proceeding with handover towards this particular target NG-RAN node. |

-continued

| | Meaning |
|---|---|
| Handover failure in target 5GC/NG-RAN node or target system | The handover failed due to a failure in target 5GC/NG-RAN node or target system. |
| Handover target not allowed | Handover to the indicated target cell is not allowed for the UE in question. |
| $TNG_{RELOCoverall}$ expiry | The reason for the action is expiry of timer $TNG_{RELOCoverall}$. |
| $TNG_{RELOCprep}$ expiry | Handover Preparation procedure is cancelled when timer $TNG_{RELOCprep}$ expires. |
| Cell not available | The concerned cell is not available. |
| Unknown target ID | Handover rejected because the target ID is not known to the AMF. |
| No radio resources available in target cell | Load on target cell is too high. |
| Unknown local UE NGAP ID | The action failed because the receiving node does not recognise the local UE NGAP ID. |
| Inconsistent remote UE NGAP ID | The action failed because the receiving node considers that the received remote UE NGAP ID is inconsistent. |
| Handover desirable for radio reasons | The reason for requesting handover is radio related. |
| Time critical handover | Handover is requested for time critical reason i.e., this cause value is reserved to represent all critical cases where the connection is likely to be dropped if handover is not performed. |
| Resource optimisation handover | The reason for requesting handover is to improve the load distribution with the neighbour cells. |
| Reduce load in serving cell | Load on serving cell needs to be reduced. When applied to handover preparation, it indicates the handover is triggered due to load balancing. |
| User inactivity | The action is requested due to user inactivity on all PDU sessions, e.g., NG is requested to be released in order to optimise the radio resources. This cause value may need to be refined, taking into account cause values for RRC_INACTIVE. |
| Radio connection with UE lost | The action is requested due to losing the radio connection to the UE. |
| Load balancing TAU required | The action is requested for all load balancing and offload cases in the AMF. |
| Radio resources not available | No requested radio resources are available. |
| Invalid QoS combination | The action was failed because of invalid QoS combination. This cause value may need to be refined. |
| Failure in the radio interface procedure | Radio interface procedure has failed. |
| Interaction with other procedure | The action is due to an ongoing interaction with another procedure. |
| Unknown PDU Session ID | The action failed because the PDU Session ID is unknown in the NG-RAN node. |
| Unknown QoS Flow ID | The action failed because the QoS Flow ID is unknown in the NG-RAN node. |
| Multiple PDU Session ID instances | The action failed because multiple instance of the same PDU Session had been provided to the NG-RAN node. |
| Multiple QoS Flow ID instances | The action failed because multiple instances of the same QoS flow had been provided to the NG-RAN node. |
| Encryption and/or integrity protection algorithms not supported | The NG-RAN node is unable to support any of the encryption and/or integrity protection algorithms supported by the UE. |
| NG intra system handover triggered | The action is due to a NG intra system handover that has been triggered. |
| NG inter system handover triggered | The action is due to a NG inter system handover that has been triggered. |
| Xn handover triggered | The action is due to an Xn handover that has been triggered. |
| Not supported 5QI value | The QoS flow setup failed because the requested 5QI is not supported. |
| UE context transfer | The action is due to a UE resumes from the NG-RAN node different from the one which sent the UE into RRC_INACTIVE state. |
| IMS voice EPS fallback or RAT fallback triggered | The setup of QoS flow is failed due to EPS fallback or RAT fallback for IMS voice using handover or redirection. |
| UP integrity protection not possible | The PDU session cannot be accepted according to the required user plane integrity protection policy. |
| UP confidentiality protection not possible | The PDU session cannot be accepted according to the required user plane confidentiality protection policy. |
| Slice not supported | Slice not supported. |
| UE in RRC_INACTIVE state not reachable | The action is requested due to RAN paging failure. |
| N26 interface not available | The failure is due to N26 not available for the target TAI. |

| | Meaning |
|---|---|
| Transport Layer cause | |
| Transport resource unavailable | The required transport resources are not available. |
| Unspecified | Sent when none of the above cause values applies but still the cause is Transport Network Layer related. |
| NAS cause | |
| Normal release | The release is normal. |
| Authentication failure | The action is due to authentication failure. |
| Deregister | The action is due to deregister. |
| Unspecified | Sent when none of the above cause values applies but still the cause is NAS related. |
| Protocol cause | |
| Transfer syntax error | The received message included a transfer syntax error. |
| Abstract syntax error (reject) | The received message included an abstract syntax error and the concerning criticality indicated "reject". |
| Abstract syntax error (ignore and notify) | The received message included an abstract syntax error and the concerning criticality indicated "ignore and notify". |
| Message not compatible with receiver state | The received message was not compatible with the receiver state. |
| Semantic error | The received message included a semantic error. |
| Abstract syntax error (falsely constructed message) | The received message contained IEs or IE groups in wrong order or with too many occurrences. |
| Unspecified | Sent when none of the above cause values applies but still the cause is Protocol related. |
| Miscellaneous cause | |
| Control processing overload | Control processing overload. |
| Not enough user plane processing resources | Not enough resources are available related to user plane processing. |
| Hardware failure | Action related to hardware failure. |
| O&M intervention | The action is due to O&M intervention. |
| Unknown PLMN | The AMF does not identify any PLMN provided by the NG-RAN node. |
| Unspecified failure | Sent when none of the above cause values applies and the cause is not related to any of the categories Radio Network Layer, Transport Network Layer, NAS or Protocol. |

Figure 7:
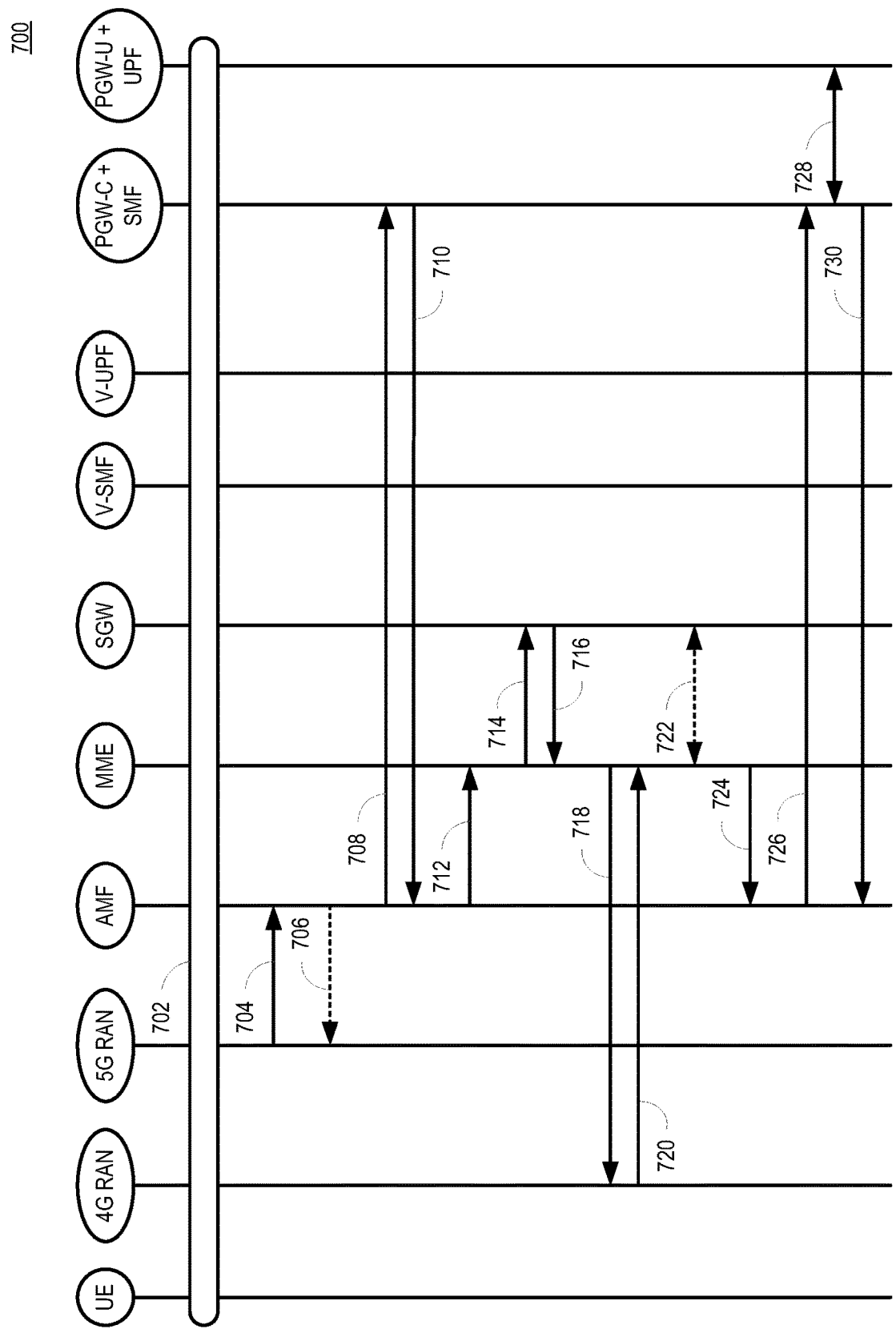
FIG. 7 is a first message flow for a handover that is selectively performed using an N26 interface according to some embodiments.

FIG. 7 is a first message flow 700 for a handover that is selectively performed using an N26 interface according to some embodiments. The message flow 700 is implemented in some embodiments of the communication system 100 shown in FIG. 1, the communication system 300 shown in FIG. 3, and the communication system 400 shown in FIG. 4.

A PDU session and a quality-of-service (QoS) flow are set up for a user equipment (UE) at block 702. Initially, the PDU session is established between the user equipment and the 5G RAN.

The user equipment transmits a handover request message 704 to the AMF to request handover to the 4G RAN. In response to receiving the handover request message 704, the AMF determines whether the N26 interface is available to support the requested handover. If the N26 interface is not available to support the requested handover, the AMF transmits a handover rejection message 706 to the 5G RAN. In response to receiving the handover rejection message 706, the 5G RAN performs a redirect via a shared network entity (as discussed herein) or attempts to handover to another candidate 4G RAN that is supported by an available N26 interface. If no available N26 interfaces are found, the message flows 700 ends at this point.

If the N26 interface is available to support the requested handover (or if an available N26 interface is found for another candidate 4G RAN), the message flow 700 continues. The AMF transmits a PDU session context request message 708 to the control plane functionality PGW-C+ SMF, which responds with a PDU session context response 710. The AMF then transmits a relocation request message 712 to the MME, which transmits a create session request message 714 to the SGW. A create session response message 716 is transmitted from the SGW to the MME. In response to receiving the create session request message 716, the MME transmits a handover request message 718 to the 4G RAN, which responds with a handover request acknowledgment message 720.

The MME and the SGW exchange requests and responses (at 722) to create an indirect data forwarding tunnel. The MME then transmits a relocation response message 724 to the AMF. The AMF transmits a PDU session update context request message 726 to the PGW-C+SMF, which then performs session modification 728 with the user plane functionality PGW-U+UPF. The PGW-C+SMF transmits a PDU session update context response message 730 to the AMF.

Figure 8:
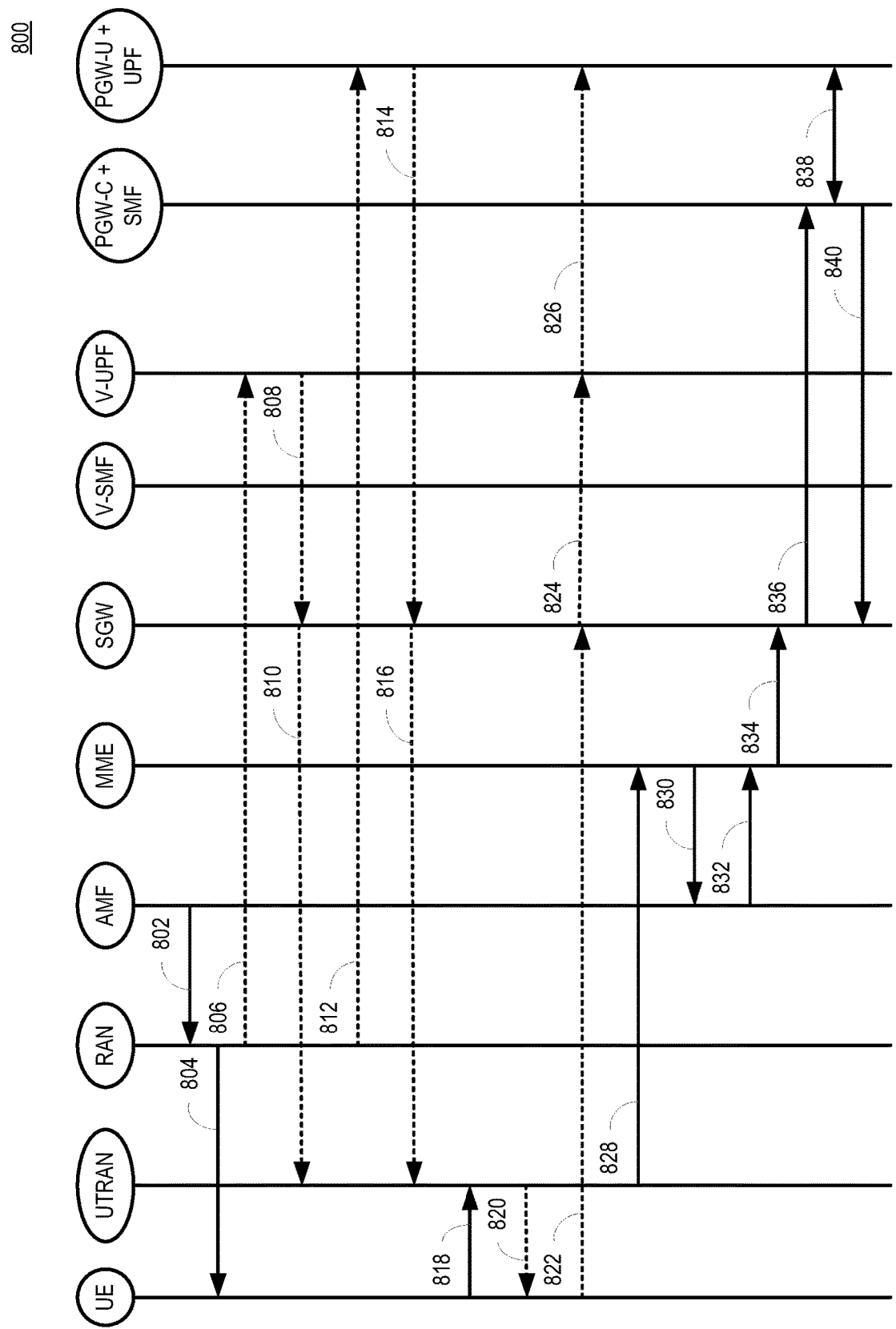
FIG. 8 is a second message flow for a handover that is selectively performed using an N26 interface according to some embodiments.

FIG. 8 is a second message flow 800 for a handover that is selectively performed using an N26 interface according to some embodiments. The second message flow 800 is performed subsequently to the first message flow 700 shown in FIG. 7. For example, the second message flow 800 begins in response to the PGW-C+SMF transmitting a PDU session update context response message 730 to the AMF, as shown in FIG. 7. The message flow 800 is implemented in some embodiments of the communication system 100 shown in FIG. 1, the communication system 300 shown in FIG. 3, and the communication system 400 shown in FIG. 4.

The AMF transmits a handover command 802 to instruct the 5G RAN to handover the user equipment to the 4G RAN. In response to receiving the handover command 802, the 5G RAN transmits a handover command 804 to the user equipment. In the home routed roaming case, the 5G RAN begins downlink data forwarding 806 to the V-UPF, which forwards (at 808) the data to the SGW. The data received at the SGW is forwarded (at 810) to the 4G RAN. In the non-roaming or local breakout roaming case, the 5G RAN begins downlink data forwarding 812 to the PGW-U+UPF, which forwards (at 814) the data to the SGW. The data received at the SGW is forwarded (at 816) to the 4G RAN.

The user equipment sends a handover complete message 818 to indicate that the user equipment has completed handover from the 5G RAN to the 4G RAN. In response to receiving the handover complete message 818, the 4G RAN can forward (at 820) in the available downlink data to the user equipment. The user equipment transmits uplink data 822 to the SGW using the prepared bearers. The SGW forwards (at 824) the uplink data to the V-UPF, which then forwards (at 826) the uplink data to the PGW-U+UPF.

The 4G RAN notifies the MME of the completed handover by transmitting a handover notification message 828 to the MME. The MME transmits a relocation complete notification message 830 to the AMF, which responds with a relocation complete acknowledgment message 832. The MME transmits a modified bearer request message 834 to the SGW, which forwards a modify bearer request message 836 to the PGW-C+SMF. A session modification 838 is performed by the PGW-C+SMF and the PGW-U+UPF. The PGW-C+SMF then transmits a modify bearer response message 840 to the SGW.

FIG. 9 is a third message flow 900 for a handover that is selectively performed using an N26 interface according to some embodiments. The third message flow 900 is performed subsequently to the second message flow 800 shown in FIG. 8. For example, the third message flow 900 begins in response to the PGW-C+SMF transmitting the modify bearer response message 840 to the SGW, as shown in FIG. 8. The message flow 900 is implemented in some embodiments of the communication system 100 shown in FIG. 1, the communication system 300 shown in FIG. 3, and the communication system 400 shown in FIG. 4.

Downlink data 902 is transmitted from the PGW-U+UPF to the V-UPF, which then forwards (at 904) the downlink data to the SGW. Prepared bearers are used to convey (at 906) the downlink data to the user equipment. The SGW transmits a modify bearer response message 908 to the MME. A tracking area update procedure is performed at 910 and then bearer activation is performed, e.g., as a PGW initiated dedicated bearer activation process 912. The indirect data forwarding tunnel is deleted using request response messages exchanged at 914 by the MME and SGW. An indirect data forwarding tunnel is deleted using request and response messages exchanged at 916 by the AMF and the PGW-C+SMF. A session modification 918 is performed by the PGW-C+SMF and the PGW-U+UPF.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
    receiving, at an access and mobility management function (AMF) in a first wireless communication system or a mobility management entity (MME) in a second wireless communication system, a request for handover of a user equipment between a first radio access network (RAN) and a second RAN; and providing, from the AMF or the MME, a rejection of the request for handover, the rejection including a cause indicating that an interface between the AMF and the MME is unavailable for handing over the user equipment, wherein providing the rejection of the request for handover comprises providing information indicating whether the interface is permanently or temporarily unavailable.

2. The method of claim 1, further comprising:

determining that the interface is unavailable or available for handing over the user equipment based on additionally one or more of the following: a type of the user equipment, a subscription status of the user equipment, a roaming status of the user equipment, and a public land mobile network (PLMN) identifier associated with the user equipment.

3. The method of claim 1, wherein providing the rejection of the request for handover comprises providing information indicating whether the interface is unavailable for handoffs to at least one of a cell identifier, a tracking area identifier, a public land mobile network (PLMN) identifier, a network slice identifier, an identifier of a MME/AMF pool area, and a RAN-core network interface identifier.

4. The method of claim 1, further comprising:

providing, from the AMF or the MME, information indicating availability status of an area that includes at least one of the first RAN and the second RAN.

5. The method of claim 4, further comprising:

providing the information indicating the availability status of the area prior to receiving the request for the handover.

6. The method of claim 5, wherein the first RAN is in the first wireless communication system and the second RAN is in the second wireless communication system, the method further comprising:

receiving, at the AMF and from the first RAN, information identifying an area in the second wireless communication system, the area including the second RAN, and wherein providing the information indicating the availability status comprises providing information indicating the availability status in response to receiving the information identifying the area.

7. The method of claim 6, wherein the information identifying the area includes at least one of a cell identifier, a tracking area identifier, a public land mobile network (PLMN) identifier, a network slice identifier, an identifier of a MME/AMF pool area, and a RAN-core network interface identifier.

8. An apparatus for implementing an access and mobility management function (AMF) in a first wireless communication system or a mobility management entity (MME) in a second wireless communication system, the apparatus comprising at least one processor; and at least one memory including computer program code, the at least one memory and the computer program code configured to, with the at least one processor, cause the apparatus at least to:

receive a request for handover of a user equipment between a first radio access network (RAN) and a second RAN; and provide a rejection of the request for handover, the rejection including a cause indicating that an interface between the AMF and the MME is unavailable for handing over the user equipment, wherein the apparatus is caused to provide the rejection of the request for handover by providing information indicating whether the interface is permanently or temporarily unavailable.

9. The apparatus of claim 8, wherein the at least one memory and the computer program code are further configured to, with the at least one processor, cause the apparatus at least to:

determine that the interface is unavailable or available for handing over the user equipment based on additionally one or more of the following: a type of the user equipment, a subscription status of the user equipment, a roaming status of the user equipment, and a public land mobile network (PLMN) identifier associated with the user equipment.

10. The apparatus of claim 8, wherein the apparatus is caused to provide the rejection of the request for handover by providing information indicating whether the interface is unavailable for handoffs to at least one of a cell identifier, a tracking area identifier, a public land mobile network (PLMN) identifier, a network slice identifier, an identifier of a MME/AMF pool area, and a RAN-core network interface identifier.

11. The apparatus of claim 8, wherein the at least one memory and the computer program code are further configured to, with the at least one processor, cause the apparatus at least to:

provide, information indicating availability status of an area that includes at least one of the first RAN and the second RAN.

12. The apparatus of claim 11, wherein the at least one memory and the computer program code are further configured to, with the at least one processor, cause the apparatus at least to:

provide the information indicating the availability status of the area prior to receiving the request for the handover.

13. The apparatus of claim 12, wherein the first RAN is in the first wireless communication system and the second RAN is in the second wireless communication system, and wherein the at least one memory and the computer program code are further configured to, with the at least one processor, cause the apparatus at least to:

receive from the first RAN, information identifying an area in the second wireless communication system, the area including the second RAN, and wherein the apparatus is caused to provide the information indicating the availability status by providing information indicating the availability status in response to receiving the information identifying the area.

14. The apparatus of claim 13, wherein the information identifying the area includes at least one of a cell identifier, a tracking area identifier, a public land mobile network (PLMN) identifier, a network slice identifier, an identifier of a MME/AMF pool area, and a RAN-core network interface identifier.

15. A method comprising:

receiving, at an access and mobility management function (AMF) in a first wireless communication system or a mobility management entity (MME) in a second wireless communication system, a request for handover of a user equipment between a first radio access network (RAN) and a second RAN; and providing, from the AMF or the MME, a rejection of the request for handover, the rejection including a cause indicating that an interface between the AMF and the MME is unavailable for handing over the user equipment, wherein providing the rejection of the request for handover comprises providing information indicating whether the interface is unavailable for handoffs to at least one of a cell identifier, a tracking area identifier, a public land mobile network (PLMN) identifier, a network slice identifier, an identifier of a MME/AMF pool area, and a RAN-core network interface identifier.

16. The method of claim 15, further comprising:
determining that the interface is unavailable or available for handing over the user equipment based on additionally one or more of the following: a type of the user equipment, a subscription status of the user equipment, a roaming status of the user equipment, and a public land mobile network (PLMN) identifier associated with the user equipment.

17. The method of claim 15, further comprising:
providing, from the AMF or the MME, information indicating availability status of an area that includes at least one of the first RAN and the second RAN.

18. The method of claim 17, further comprising:
providing the information indicating the availability status of the area prior to receiving the request for the handover.

19. The method of claim 18, wherein the first RAN is in the first wireless communication system and the second RAN is in the second wireless communication system, the method further comprising:
receiving, at the AMF and from the first RAN, information identifying an area in the second wireless communication system, the area including the second RAN, and wherein providing the information indicating the availability status comprises providing information indicating the availability status in response to receiving the information identifying the area.

20. The method of claim 19, wherein the information identifying the area includes at least one of a cell identifier, a tracking area identifier, a public land mobile network (PLMN) identifier, a network slice identifier, an identifier of a MME/AMF pool area, and a RAN-core network interface identifier.

* * * * *

UNITED STATES PATENT AND TRADEMARK OFFICE
CERTIFICATE OF CORRECTION

| | |
|---|---|
| PATENT NO. | : 11,102,683 B2 |
| APPLICATION NO. | : 16/448524 |
| DATED | : August 24, 2021 |
| INVENTOR(S) | : Sillanpaa et al. |

It is certified that error appears in the above-identified patent and that said Letters Patent is hereby corrected as shown below:

On the Title Page

Item (30) Foreign Application Priority Data should read:
--Jun. 22, 2018 (EP) ..........PCT/EP2018/066838--.

Signed and Sealed this
Twelfth Day of September, 2023

Katherine Kelly Vidal
*Director of the United States Patent and Trademark Office*